No. 826,213. PATENTED JULY 17, 1906.
N. AHRBIN.
APPARATUS FOR VULCANIZING RUBBER TIRES.
APPLICATION FILED SEPT. 6, 1905.
2 SHEETS—SHEET 1.
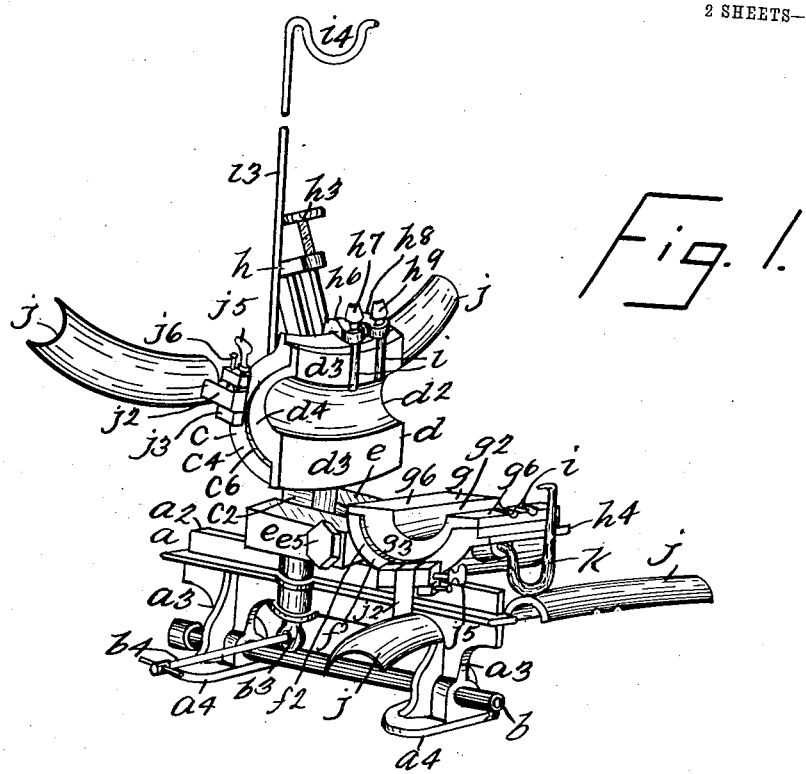
WITNESSES
J. C. Larsen
T. A. Stewart
INVENTOR
Nels Ahrbin
BY Edgar Tate & Co
ATTORNEYS No. 826,213.
PATENTED JULY 17, 1906.
N. AHRBIN.
APPARATUS FOR VULCANIZING RUBBER TIRES.
APPLICATION FILED SEPT. 6, 1905.
2 SHEETS—SHEET 2.
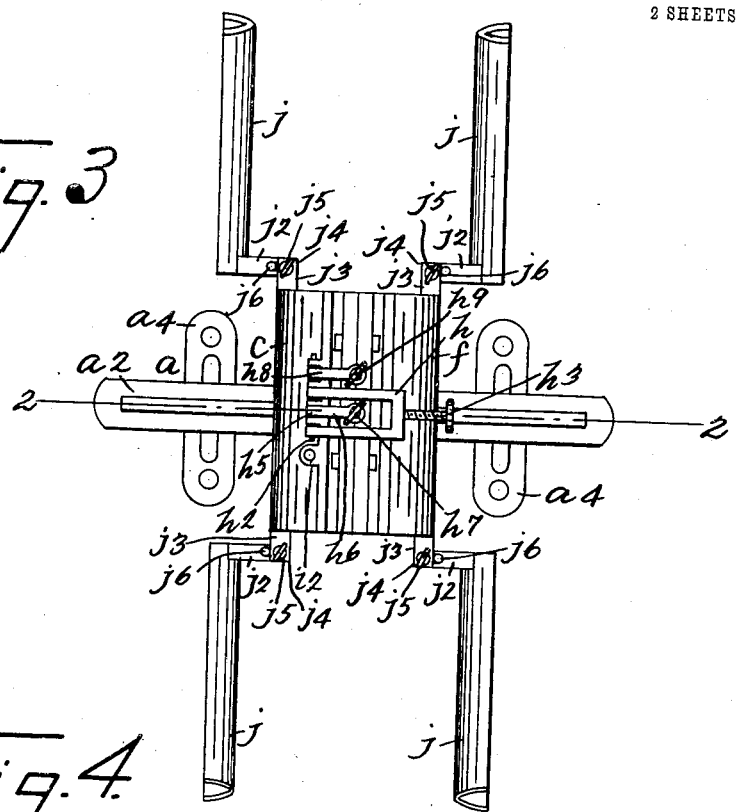
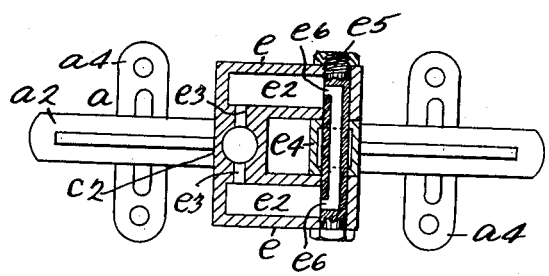
WITNESSES
J. C. Larsen
F. A. Stewart
INVENTOR
Nels Ahrbin
BY Edgar Sealer & Co
ATTORNEYS

UNITED STATES PATENT OFFICE.

NELS AHRBIN, OF NEW YORK, N. Y.

APPARATUS FOR VULCANIZING RUBBER TIRES.

No. 826,213.   Specification of Letters Patent.   Patented July 17, 1906.

Application filed September 6, 1905. Serial No. 277,193.

*To all whom it may concern:*

Be it known that I, NELS AHRBIN, a subject of the King of Sweden and Norway, residing at New York, in the county of New York and State of New York, have invented certain new and useful Improvements in Apparatus for Vulcanizing Rubber Tires, of which the following is a specification, such as will enable those skilled in the art to which it appertains to make and use the same.

This invention relates to apparatus for vulcanizing rubber tires; and the object thereof is to provide an improved apparatus of this class which is particularly designed for use in the repairing of rubber tires or in vulcanizing parts of a rubber tire in the operation of repairing the same, a further object being to provide an apparatus of the class specified which is adapted for use in repairing and vulcanizing rubber tires of different sizes in transverse section; and with these and other objects in view the invention consists in an apparatus of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a perspective view of my improved apparatus and showing the parts thereof in an open position; Fig. 2, a transverse section on the line 2 2 of Fig. 3 and showing the parts in a closed position; Fig. 3, a plan view of the apparatus as shown in Fig. 2, and Fig. 4 a partial section on the line 4 4 of Fig. 2.

In the practice of my invention I provide a base member, frame, or support $a$, which comprises a horizontal top portion $a^2$, supported by legs $a^3$, having transversely-arranged feet $a^4$, and mounted in the leg members $a^3$ in the form of construction shown is a gas-pipe $b$, having an upwardly-directed nozzle $b^2$, provided with a valve $b^3$, having a stem $b^4$, by which it may be operated.

The operative parts of the apparatus are mounted above the base member, frame, or support $a$ and comprise a main stationary jaw $c$, having a central depending tubular member $c^2$, the lower end of which passes downwardly through the horizontal part $a^2$ of the base member, frame, or support and receives the nozzle $b^2$, which is connected with the gas-pipe $b$. The main stationary jaw $c$ is oblong in form and approximately semicircular in cross-section, and the inner side thereof is hollowed out to form a chamber or recess $c^3$ and inwardly-directed end flanges $c^4$, and placed within the main stationary jaw $c$ is a supplemental detachable jaw $d$, which is of the same general form as the main stationary jaw $c$ and the front face of which is provided with a longitudinal segmental groove $d^2$, above and below which are plain faces or face-plates $d^3$, and the end of the supplemental detachable jaw $d$ is provided with backwardly-directed end flanges $d^4$, which, taken in connection with the hollowed-out recess or chamber $c^3$ in the main stationary jaw $c$, forms a main gas-chamber $c^5$ in the main stationary jaw $c$. The end flanges $c^4$ and $d^4$ of the main stationary jaw $c$ and the supplemental detachable jaw $d$ are so shaped as to produce between the said jaws and at the opposite ends thereof segmental slots or openings $c^6$, which communicate with the chamber $c^5$, and placed in the bottom of the chamber $c^5$ longitudinally thereof is a screen $c^7$, which covers a port or passage $c^8$, which forms a communication between the tubular member $c^2$ and the chamber $c^5$, and said screen serves to distribute the gas throughout the said chamber $c^5$, in which in the operation of the apparatus the gas is ignited and burned.

Connected with the bottom portion of the tubular member $c^2$, above the base frame or support $a$, are two parallel and horizontal members $e$, which are hollow or provided with longitudinal passages $e^2$, which communicate, by means of ports or passages $e^3$, with the tubular member $c^2$, as clearly shown in Figs. 2 and 4, and connected with the hinge members $e$ is a main movable jaw $f$, which corresponds with the main stationary jaw $c$ and which is of the same general form as said main stationary jaw $c$. The connection between the jaw $f$ and the hinge members $e$ is made by means of a central backward projection $e^4$, formed on said jaw and which fits between the hinge members $e$ and through which is passed a valve-tube $e^5$, which communicates, by means of ports or passages $e^6$, with the passages $e^2$ in the hinge members $e$.

The jaw $f$, as hereinbefore stated, is of the same general form as the jaw $c$ and is provided with inwardly-directed end flanges $f^2$, and placed in said jaw is a supplemental detachable jaw $g$, which is of the same form as the jaw $d$ and provided in the face thereof with a longitudinal segmental groove $g^2$, and at the ends thereof with backwardly-directed segmental end flanges $g^3$, and the flanges $f^2$ and $g^3$ on the jaws $f$ and $g$ form a main gas-chamber $f^4$ between the jaws $f$ and $g$, similar to the chamber $c^5$ between the jaws $c$ and $d$ and in the bottom of which is placed a longitudinal screen $g^4$.

The central backwardly-directed projection $e^4$ forms a port or passage, which connects the jaw $f$ with the hinge members $e$ and is hollow, as shown in Figs. 2 and 4, and between said projection $e^4$ and the chamber $f^4$ in the jaw $f$, or between the jaws $f$ and $g$, is a port or passage $e^7$, similar to the port or passage $c^8$ and through which the gas is admitted into the chamber $f^4$, and the tube $e^5$, as will be seen in Fig. 2, is provided with a port or passage $g^5$, through which the gas passes into the hinge member $e^4$.

From the foregoing description it will be seen that the parts $e$ and $d$, although described herein as main and supplemental jaws, form, in effect, a main stationary jaw, in which is a gas-chamber having segmental slots or openings at its opposite ends, and the parts $g$ and $f$, although herein, respectively, described as a main movable and supplemental jaw, form, in effect, a main movable jaw having a central gas-chamber similar to that in the main stationary jaw formed by the parts $c$ and $d$.

In Fig. 1 of the drawings the main operative parts, formed, respectively, by the jaws $c$ and $d$ and jaws $f$ and $g$, connected as described, are shown in an open position, and in Fig. 2 the said parts are shown in a closed position, the movable parts or members being also indicated in an open position in dotted lines.

The main stationary jaw $c$ is provided at the top thereof and centrally thereof with a yoke-shaped clamp $h$, which is hinged thereto at $h^2$ and at the free end of which is a set-screw $h^3$, adapted to bear on a longitudinal flange $h^4$ at the top of the jaw member $f$, and in this way the main operative parts of the apparatus comprising, respectively, the jaws $c$ and $d$ and the jaws $f$ and $g$ may be locked together, as shown in Fig. 2.

Pivoted at $h^5$ and by the same pivot-pin that holds the yoke-shaped clamp $h$ is a dog $h^6$, through the free end of which is passed a screw $h^7$, and at one side of the yoke-shaped clamp $h$ is pivoted another dog $h^8$, through the free end of which is passed a screw $h^9$.

The supplemental jaw $g$, which is placed in the main movable jaw $f$, has top and bottom face-plates $g^6$, similar to the face-plates $d^3$ at the top and bottom of the jaw $d$, and the face-plate $d^3$ at the top of the jaw $d$ and the face-plate $g^6$ at the top of the jaw $g$ are provided with vertically-arranged grooves $i$, which are adapted to receive the ends of the screws $h^7$ and $h^9$, carried by the dogs $h^6$ and $h^8$.

At the top back portion of the jaw $c$ is a socket $i^2$, adapted to receive a rod $i^3$, having at its top a forwardly-directed loop member $i^4$, from which in practice a rubber tire may be suspended, and the operation of the apparatus as herein described will be readily understood from the foregoing description when taken in connection with the accompanying drawings and the following statement thereof. In practice the tire to be mended or repaired is suspended from the loop member $i^4$, and that part thereof to be vulcanized is placed in the groove $d^2$ in the jaw member $d$, and the movable jaw member comprising the parts $f$ and $g$ is swung into the closed position, as shown in Fig. 2, and locked therein. At this time the gas is admitted into the chambers formed by the stationary and movable jaw members consisting, respectively, of the parts $c$ and $d$ and of the parts $f$ and $g$, and this gas is ignited through the end slots or openings $c^6$ in said jaw members, and the said jaw members are heated to the required degree and the vulcanizing process is carried on as in other apparatus of this class.

The screws $h^7$ and $h^9$ are intended for use in case a tire is to be repaired at the point where the valve-nozzle used for inflating the tire is located, and when necessary either of these screws may be turned down far enough to form in the tire the necessary opening, or the dogs that carry these screws may be turned back out of operative position, in which event, if the tire is suitably provided with an air-valve nozzle, the said valve-nozzle will fit in one of the recesses $i$, formed in the face-plates $d^3$ and $g^6$ of the jaw members $d$ and $g$, and when the tire is to be mended or repaired at other points the screws $h^7$ and $h^9$ are manipulated, so as to fill the grooves or recess $i$ and so that the inner ends thereof will be flush with the top wall of the segmental grooves $d^2$ and $g^2$ in the jaw members $d$ and $g$.

In order to provide the apparatus with means whereby tires of different thickness or dimensions may be repaired or mended and vulcanized, separate pairs of auxiliary jaws $j$ are pivoted or hinged to the opposite ends of the jaw members $c$ and $f$, as clearly shown in Figs. 1 and 3, one pair of said auxiliary jaws being shown in position for use in Fig. 2. The only difference between the jaws $j$ at the opposite ends of the apparatus is in the fact that one pair is thicker than the other, so as to adapt the apparatus to different thicknesses of tires, as hereinbefore described. It will be observed that the connection between the separate pairs of auxiliary jaws $j$ and the jaw members $c$ and $f$ is made by means of projections $j^2$ and $j^3$, formed or connected with the parts $j$ and $c$ and $f$, the said projections $j^2$ and $j^3$ forming hinge members connected at $j^4$ in the usual manner, and the form and dimensions of the hinge members is such that when the parts are in the open position, as shown in Fig. 1, the auxiliary jaw members $j$ at either end of the apparatus may be swung into position between the jaw members $d$ and $g$. It will be observed that the auxiliary jaw members $j$ are made segmental in cross-section and resemble the half of a pipe of equal length, and the length of said jaw members $j$ is the same as that of the grooves $d^2$ and $g^2$ of the jaw members $d$ and $g$, and when said jaw members $j$ at either end of the apparatus are swung into the operative position they only serve to decrease the diameter of the circular space formed by the grooves $d^2$ and $g^2$ in the jaw members $d$ and $g$.

It will be observed that the apparatus may be used without either of the auxiliary jaw members $j$ being swung into position, and in this event the diameter of the grooves $d^2$ and $g^2$ in the jaw members $d$ and $g$ will fix the diameter of the tire to be repaired or vulcanized, and when smaller tires are to be operated upon either set of jaw members $j$ may be swung into position, as may be desired, and it will also be understood that the separate sets or pairs of jaw members $j$ may differ in thickness to any desired extent.

The movable jaw member is also provided with a handle $k$, by which it may be manipulated or swung into its different positions, and any suitable means may be provided for holding the auxiliary jaw members $j$ or the different sets thereof in the open position, so that they will not interfere with the operation of the apparatus when the use thereof is not required.

The auxiliary jaw members $j$ or the separate pairs thereof are provided with pintle-pins having handles $j^5$, by which they may be easily manipulated, and the auxiliary jaws or the separate pairs thereof may be entirely detached, if desired or whenever desired, and locking-keys $j^6$ are also preferably provided for holding the auxiliary jaws $j$ in an open position; but any suitable means may be provided for this purpose.

This apparatus may be used for vulcanizing rubber tires of any kind or class, and especially in repairing such tires, and by means of the construction herein described tires of different sizes, as will be apparent, may be mended, vulcanized, or repaired, and my improvement is not limited to the exact construction of the various parts of my improved apparatus, and various changes in and modifications of the construction herein shown and described may be made without departing from the spirit of my invention or sacrificing its advantages.

Having fully described my invention, what I claim as new, and desire to secure by Letters Patent, is—

1. An apparatus of the class described provided with a stationary and a movable jaw member, and means for locking said jaw members together, said jaw members being also provided in their adjacent faces with segmental grooves and means for varying the dimensions of said grooves, comprising separate sets of auxiliary jaws hinged to the opposite ends of the first-named jaw members and adapted to swing into position between the first-named jaw members and to occupy the grooves therein, substantially as shown and described.

2. An apparatus of the class described, comprising a frame or support, a main stationary jaw mounted thereover, a main movable jaw operating in connection with the stationary jaw, said jaws being provided with interior gas-burning chambers, means for supplying gas to said chambers, said jaws being also provided in their adjacent faces with segmental grooves, and means for varying the dimensions of said grooves, substantially as shown and described.

3. An apparatus of the class described, comprising a frame or support, a main stationary jaw mounted thereover, a main movable jaw operating in connection with the stationary jaw, said jaws being provided with interior gas-burning chambers, means for supplying gas to said chambers, said jaws being also provided in their adjacent faces with segmental grooves, and means for varying the dimensions of said grooves, consisting of auxiliary jaw members pivoted in pairs at the opposite ends of the first-named jaw members and adapted to be swung into position in said grooves, said auxiliary jaw members being segmental in cross-section, substantially as shown and described.

4. In an apparatus of the class described, a base frame or support, a main stationary jaw mounted thereover, a main movable jaw adapted to operate in connection with the stationary jaw, said jaws being composed of separate detachable parts, and the inner parts of said jaws being provided with segmental grooves in their adjacent faces, said jaws being also provided in the separate parts thereof with gas-burning chambers, and means for supplying gas to said chambers, substantially as shown and described.

5. An apparatus of the class described, comprising a base frame or support, a main stationary jaw supported thereover and provided with an interior gas-burning chamber and a segmental groove in the face thereof, a main movable jaw operating in connection with the first-named jaw and provided with an interior gas-burning chamber and with a segmental groove in the face thereof, a support arranged above said jaws, means for locking said jaws together, and devices for varying the dimensions of said grooves, substantially as shown and described.

6. An apparatus of the class described, comprising a base frame or support, a main stationary jaw supported thereover and provided with an interior gas-burning chamber and a segmental groove in the face thereof, a main movable jaw operating in connection with the first-named jaw and provided with an interior gas-burning chamber and with a segmental groove in the face thereof, a support arranged above said jaws, means for locking said jaws together, and devices for varying the dimensions of said grooves, consisting of auxiliary jaws pivoted in pairs at the opposite ends of the main jaws and adapted to be swung into said grooves, substantially as shown and described.

7. An apparatus for vulcanizing tires, comprising a main stationary and a main movable jaw, said jaws being provided with gas-burning chambers and means for supplying gas thereto, said jaws being also provided in their adjacent faces with segmental grooves, and in their adjacent faces above said grooves with vertically-arranged grooves, and dogs pivoted to one of said jaws and provided with screws adapted to enter the vertically-arranged grooves, substantially as shown and described.

8. An apparatus for vulcanizing rubber tires provided with a stationary jaw and a movable jaw hinged in position and adapted to swing in a vertical plane toward and from the stationary jaw, and a tire-support above the stationary jaw, the adjacent faces of said jaws when locked together being in a vertical plane which ranges transversely of the apparatus, substantially as shown and described.

9. An apparatus of the class described provided with a stationary jaw and a movable jaw hinged in position and adapted to swing in a vertical plane toward and from the stationary jaw, said jaw members being provided in their adjacent faces with segmental grooves, means for locking said jaw members together, and devices for varying the dimensions of said grooves, substantially as shown and described.

10. An apparatus of the class described provided with a main stationary jaw and a movable jaw hinged in position and adapted to swing in a vertical plane toward and from the stationary jaw, said jaws being provided in their adjacent faces with segmental grooves and with gas-burning chambers, means for supplying gas to said chambers, and means for locking said jaws together, substantially as shown and described.

11. An apparatus of the class described provided with a main stationary jaw and a movable jaw hinged in position and adapted to swing in a vertical plane toward and from the stationary jaw, said jaws being provided in their adjacent faces with segmental grooves and with gas-burning chambers, means for supplying gas to said chambers, means for locking said jaws together, and devices for varying the dimensions of said grooves, substantially as shown and described.

In testimony that I claim the foregoing as my invention I have signed my name, in presence of the subscribing witnesses, this 5th day of September, 1905.

NELS AHRBIN.

Witnesses:
F. A. STEWART,
C. E. MULREANY.